(12) United States Patent
Kauhanen et al.

(10) Patent No.: US 7,330,542 B2
(45) Date of Patent: Feb. 12, 2008

(54) METHOD AND SYSTEM FOR ESTABLISHING A MULTIMEDIA CONNECTION BY NEGOTIATING CAPABILITY IN AN OUTBAND CONTROL CHANNEL

(75) Inventors: Timo Kauhanen, Kirkkonummi (FI); Juha Räsänen, Espoo (FI); Mark Lybeck, Helsinki (FI)

(73) Assignee: Nokia Corporation, Espoo (FI)

( * ) Notice: Subject to any disclaimer, the term of this patent is extended or adjusted under 35 U.S.C. 154(b) by 777 days.

(21) Appl. No.: 10/450,956

(22) PCT Filed: Dec. 22, 2000

(86) PCT No.: PCT/EP00/13252

§ 371 (c)(1),
(2), (4) Date: Nov. 10, 2003

(87) PCT Pub. No.: WO02/052825

PCT Pub. Date: Jul. 4, 2002

(65) Prior Publication Data

US 2004/0076145 A1 Apr. 22, 2004

(51) Int. Cl.
*H04M 7/00* (2006.01)

(52) U.S. Cl. ............ 379/229; 379/221.08; 379/221.09; 379/221.1; 379/221.12; 370/373; 370/377; 370/384; 370/385; 370/522; 370/524

(58) Field of Classification Search ................ 370/373, 370/377, 384, 385, 522, 524; 379/229, 221.1, 379/221.08, 221.09, 221.12
See application file for complete search history.

(56) References Cited

U.S. PATENT DOCUMENTS 5,930,264 A * 7/1999 Nguyen ...................... 370/466

6,671,367 B1 * 12/2003 Graf et al. .................. 379/229

FOREIGN PATENT DOCUMENTS

EP 0 817 452 A2 1/1998
WO WO 00/70885 11/2000

OTHER PUBLICATIONS

Handley et al, "RFC 2543 SIP: Session Initiation Protocol", Request for Comment, Online, Mar. 1999, pp. 1-153, XP002173547, network working group retrieved from Internet: URL:www.ietf.org retried on Jul. 24, 2001.
Gary A. Thom, "H. 323: The Multimedia Communications Standard for Local Area Networks", IEEE Communications Magazine, IEEE service Center, NJ, USA, vol. 34, No. 12, Dec. 1, 1996, pp. 52-56, XP000636454.
Dalgic et al, "Comparison of H.323 and SIP for IP Telephony Signaling", Proceedings of the SPIE, 1999, XP000949838.

* cited by examiner

*Primary Examiner*—Quynh H. Nguyen
(74) *Attorney, Agent, or Firm*—Squire Sanders & Dempsey LLP

(57) ABSTRACT

The present invention relates to a method and system for establishing a connection to a terminal device, wherein a user capability information defining supported types of information streams is set in a compatibility information element within an outband signaling message, and a capability negotiation is performed by transmitting said outband signaling message via an outband control channel. The code or user capability information may be set at the terminal device or at an intermediate network element based on a subscriber profile information obtained from a subscriber database. Thereby, the user capability, such as a multimedia session composition, can be already negotiated or handled during the outband call setup phase, and a corresponding inband negotiation can be avoided.

43 Claims, 5 Drawing Sheets

METHOD AND SYSTEM FOR ESTABLISHING A MULTIMEDIA CONNECTION BY NEGOTIATING CAPABILITY IN AN OUTBAND CONTROL CHANNEL

FIELD OF THE INVENTION

The present invention relates to a method and system for establishing a connection to a terminal, such as a H.324 multimedia terminal, comprising at least one information processing means arranged for processing at least one type of information stream,

BACKGROUND OF THE INVENTION

The personal computer and other digital devices are rapidly becoming key communication tools for millions of users worldwide. The importance of digital and data network communications has greatly increased with the explosion of the Internet. While electronic mail is still a dominant method of interactive computer communications, electronic conferencing and IP-based telephony are becoming increasingly attractive. The adoption of packet switching and its merging with circuit switching helps drive this communications migration. There are many reasons for this, among them pricing advantages due to improved source utilization, seamless transmissions between monomedia and multimedia communications, as well as between human-to-computer (e.g. web-based) and interpersonal interactions.

For interactive multimedia communications on packet-based networks including IP-based telephony, the relevant standard of the Telecommunication Sector of International Organization for Standardization (ITU-T) is the H.323 series of recommendations comprising besides H.323 itself H.225.0 (core message definitions), H.245 (media channel control), H.235 (security framework), H.450.x (supplementary services) and H.332 (extensions for large group conferences).

Multimedia in the circuit switched (CS) domain is realized by the H.324 (incl. H.324/I) recommendation for PSTN- and ISDN-based video conferencing terminals or devices. The H.324 terminal sets up a transparent CS data call, and the user plane connection which is called bearer in the context of third generation (3G) mobile communications, is partitioned by the H.324 terminal application into various media components. The composition of the media components is the result of an in-band negotiation, comprising those components which were offered by the calling user or terminal and supported or accepted by the called user or terminal. An in-band signaling is a signaling where the control signals are sent within a specific logical channel of the user plane connection or bearer. The partitioning of the bearer into logical channels is then performed by a H.223 multiplex protocol, and the control (i.e. setting up, releasing the logical channels etc.) is handled by a H.245 control protocol. The setup of the H.324 multimedia session is divided into two phases. Initially, an outband phase is handled by the "basic telephony" call control (CC) by which the circuit-switched call is set up and a bearer is provided. Then, an inband phase follows, where the peer H.324-terminals negotiate and set up the various media components over the established user plane connection or bearer.

However, such a split of the setup into an outband phase and an inband phase causes problems in the interworking between the packet-switched (PS) domain of e.g. an IM (IP-based Multimedia) subsystem, such as 3GPP (Third Generation Partnership Project) PS domain, and the CS domain. In the IM domain, each media component is carried by a dedicated bearer, which means that the core network "knows" the media components, and the setup of these media components can be handled by the CC outband signaling, whereas in the CS domain the setup of the media components is negotiated by the inband signaling.

A similar problem exists in a pure CS environment, since there is a complex relation between inband and outband negotiation means, which results in inflexible charging of CS multimedia calls. Also, fallback to speech, if the called party does not support multimedia, is complicated.

SUMMARY OF THE INVENTION

It is therefore an object of the present invention to provide a method and system for establishing a connection, by means of which negotiation and setup of the media components can be simplified.

This object is achieved by a method for establishing a circuit switched multimedia connection to/from a terminal device comprising at least one information processing means each supporting at least one type of information stream, the method comprising the steps of:
indicating in at least one compatibility information element within an outband signaling message the supported at least one type of information stream;
performing a capability negotiation by transmitting the outband signaling message via an outband control channel;
selecting at least one of said information processing means based on the result of said capability negotiation; and
establishing said connection to said selected at least one information processing means of said terminal.

Furthermore, the above object is achieved by a terminal device, comprising:
at least one information processing means each supporting at least one type of information stream,
setting means for indicating in at least one compatibility information element within an outband signaling message the supported at least one type of information processing means;
outband signaling control means for performing a capability negotiation by transmitting the outband signaling message via an outband control channel; and
selecting means for selecting at least one the information processing means based on the result of said capability negotiation.

Accordingly, by setting the code the compatibility information element in the outband signaling message, the desired multimedia session composition can be handled already during the call setup phase and a corresponding inband negotiation during the active phase of the call can be avoided, which results in minimized post-pickup delay and prevention of charging of call setup time. Thereby, the call can initially be set up according to the preferences negotiated outband between the calling party and the called user. If the called user e.g. wishes to receive the call as a speech (only) call, instead of an offered video (i.e. H.324) call, a speech telephony call can initially be set up without any need for an in-call modification in the beginning of the active phase of the call and a fallback procedure to speech is not required. Moreover, the fact that the proposed user capability information is transported in outband message (protocol) information elements which are transparent to the network, the effects of the enhancement or improvement to existing standards and implementations of network elements are limited or minor. Furthermore, an interworking towards multimedia systems, e.g. a 3GPP IM subsystem, in which the multimedia components are "known" is facilitated.

The information processing means may correspond to processing means for processing different media types or components, or to different codec types for one media component, or to a multiplexing/demultiplexing means for multiplexing/demultiplexing different information streams received from or transmitted to different media components or different codec types.

Additionally, the above object is achieved by a method for establishing a connection to a terminal, said method comprising the steps of:

storing user profiles indicating supported types of information streams in a subscriber database;

reading a user profile of the terminal from the subscriber database;

setting a user capability information in an outband signaling message based on the read user profile of the terminal; and performing a capability negotiation by transmitting the outband signaling message via an outband control channel to a terminal of another end of the connection.

In addition, the object is achieved by a network element for establishing a connection to a terminal device, the network element comprising:

determination means for obtaining a user profile of the terminal device based on an interrogation of a subscriber database; and conversion means for converting a received signaling message into an outband signaling message supported by the terminal device, for setting a user capability information in the outband signaling message based on the obtained user profile, and for transmitting the outband signaling message via an outband control channel to the terminal device.

Accordingly, multimedia preferences of the user can be stored as a multimedia profile in the subscriber database, such that a user interface to multimedia data is available in the network. Thus, even if the user capability cannot be determined from a corresponding outband signaling message, a corresponding user profile can be retrieved from the subscriber database of the network. Thus, the setup of the multimedia component may additionally or alternatively be performed during the outband phase and the same advantages as described above can be obtained.

The supported types of information streams may be determined and mapped into at least one code. The mapping step may performed in a gateway means arranged for adapting between circuit switched and packet switched connections. Furthermore, the mapping may be performed by analyzing at least one information stream description and determining a code identifying said at least one information stream description. The information stream description may be a session description protocol (SDP) description or a H.323 logical channel description.

The setting of the code or user compatibility information may be performed in the terminal device or in a network element which may be any intermediate non-terminal network device of a network to which the terminal device is connected.

Additionally, the setting of the code or user compatibility information may be performed in the network element if the code or user compatibility information has not yet been set in the outband signaling message or if the result of negotiation does not indicate any supported types of information streams. In particular, the network element may comprise a media gateway control function. The subscriber database may be a home location register or a home subscriber server allocated to the subscriber using the terminal device. The user profile may be a user multimedia profile. Thus, multimedia components provided at the terminal device can be retrieved from the subscriber database. Preferably, the subscriber database may be updated when the terminal device is registered to the network of the network element. Thereby, call offerings of multimedia calls which cannot be supported by the current terminal can be prevented, since the update of the subscriber database assures that the active multimedia profile does not exceed the capabilities of the terminal device. An update with every registering of the terminal device to the network ensures that the update is performed at a sufficient frequency. When a User changes the terminal to another one, the subscriber database is updated every time the user moves his SIM (Subscriber Identity Module) from the old terminal to the new terminal which may support different capabilities.

Preferably, the code or user compatibility information may be set in the LLC information element of a Q.931 setup message. The code may also be set in the LLC information element of the Mobile Radio Interface Layer 3 call control protocol in order to carry the user capability information over the Iu and radio interfaces to a mobile station or mobile terminal. The Mobile Radio Interface Layer 3 call control protocol is described in the specifications 3GPP TS 24.008 (UMTS release 99). Similarly, any other capability information element similar to the LLC may be used in the Q.931 and 24.008 protocols. In this case, media components required for the at least one information processing means may be set by using a corresponding predetermined coding of the LLC information element. Thus, supported codecs for media components can be added as new code points of the LLC information element.

As an alternative, a combination of media components required for the at least one information processing means may be set by using a corresponding predetermined coding of the LLC information element. Thereby, an easy implementation based on the fact that the majority of traffic covers only a few combination cases of media components can be provided.

As another alternative, a predetermined field in the LLC information element may be provided, the field defining a list of media components supported by the at least one information processing means. Thereby, a flexible alternative is provided, since the number of supported media types or components can be of any reasonable size.

The media components may be codec types supported by the at least one information processing means. The at least one information processing means may comprise a video codec, an audio codec, and a data processor for a data application.

The code or user compatibility information may alternatively be set in a codec list of the BC information element or another predetermined information element (e.g. HLC) of the Q.931 setup message. Thereby, existing adaptation mechanisms for speech codecs between GSM (Global System for Mobile communication) and UMTS (Universal Mobile Telecommunication System) can be used.

The capability negotiation may be performed by a mapping operation between the user capability information of the outband signaling message and a corresponding user capability information of a terminal at another end of the connection. In this case, the mapping operation may be performed at a network element. The corresponding user capability information may be provided in an SDP (Session Description Protocol) message of an SIP (Session Initiation Protocol) INVITE message. The result of negotiation may be indicated to the terminal in a Q.931 call proceeding or ISUP (ISDN User Part) address complete message, and to the other end's terminal in an SIP session progress message. Thereby, an easy adaptation between a circuit switched terminal and an IP-based terminal can be provided.

The selecting means of the terminal device may comprise a H.223 multiplexer. The outband signaling control means of the terminal device may comprise a H.225 setup control means arranged to perform outband setup control based on Q.931 messages. The terminal device may be a H.324 (H.324/I) terminal.

Furthermore, the terminal device may comprises a preselection function for enabling a user to preset a preferred composition of information processing means. Thus, a presetting or default setting function for pre-setting preferred media components or codec types can be provided to the user.

BRIEF DESCRIPTION OF THE DRAWINGS

In the following, the present invention will be described in greater detail based on a preferred embodiment with reference to the accompanying drawing figures, in which.

DESCRIPTION OF THE PREFERRED EMBODIMENT

Figure 1:
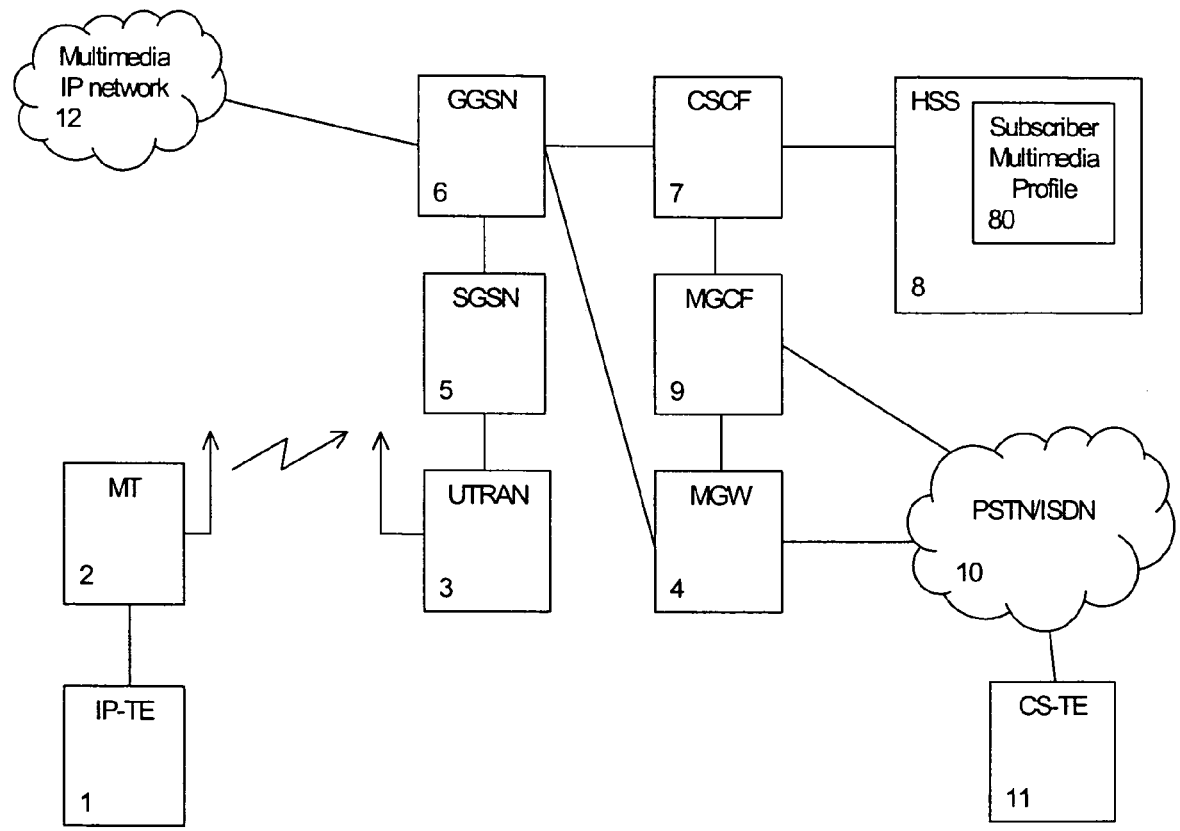
FIG. 1 shows a network system according to the 3GPP ALL IP reference model, wherein a PS multimedia terminal is connected to a CS multimedia terminal.

The preferred embodiment of the present invention will now be described on the basis of an establishment of a connection for a multimedia call in a network environment according to a 3GPP ALL IP reference model, as depicted in FIG. 1.

According to FIG. 1, an IP (Internet Protocol) terminal device or terminal equipment 1 is connected to a third generation (3G) mobile terminal 2 which provides a radio connection to a UMTS Terrestrial Radio Access Network (UTRAN) 3. The UTRAN 3 comprises at least one Radio Network Controller (RNC, not shown) for providing a switching function to e.g. a GPRS (General Packet Radio Services) network comprising a Serving GPRS Support Node (SGSN) 5 having a switching and mobility management function in the GPRS core network of the UMTS system. Furthermore, the SGSN 5 is connected to a Gateway GPRS Support Node (GGSN) 6 which provides an access function to a multimedia IP-based network 12, such as the Internet.

Additionally, the RNC of the UTRAN 3 may establish a connection to a CS terminal equipment 11 via a fixed network or PSTN/ISDN network 10 and a Media Gateway (MGW) 4 arranged for adapting the PS multimedia connection of the UMTS network (incl. the SGSN 5 and the GGSN 6) to the CS connection of the PSTN/ISDN 10. Similarly, the PS multimedia connection can be adapted to a CS connection of a CS mobile network such as the UMTS release 99 CS domain or a GSM network. In particular, the MGW 4 may allow a PS H.323 or a SIP system to interoperate with PSTN/ISDN terminals such as the CS terminal equipment 11 which may be a H.324 (H.324/I) compliant terminal. The gateway functionality of the MGW 4 is addressed e.g. in the ITU-T recommendation H.246 for the case of an interworking of H-series multimedia terminals with H-series multimedia terminals and voice/voice-band terminals on PSTN and ISDN.

The MGW 4 is connected to a Media Gateway Control Function (MGCF) 9 which is connected via a T-SGW (Transmission Signaling Gateway, not shown) to the PSTN/ISDN 10. The MGCF 9 may be connected via a Call State Control Function (CSCF) 7 to a Home Subscriber Server (HSS) 8 comprising a subscriber database. Furthermore, a subscriber multimedia profile database 80 may be provided in the HSS 8.

Therefore, the MGCF may also provide an interworking function between a CS Mobile Switching Center (MSC, not shown) within a CS mobile network and a PS network. The multimedia profile may also be actually stored to a Home Location Register (HLR, not shown) within the CS mobile network. The HLR is thus storing information on the CS subscribers' multimedia profiles. Similarly, the multimedia profile may be stored in any profile register within the CS mobile network. What is required is that the CS mobile stations update the multimedia capability information to the respective profile register. The profile register is then enquired by the MGCF 9 when there is an incoming call to the CS mobile network.

A more detailed description of the functions of the MGW 4, the MGCF 9, the CSCF 7 and related network elements may be gathered from the corresponding 3GPP Release 4 specifications.

When a multimedia connection is to be established between the IP terminal equipment 1 and the CS terminal equipment 11, an initial outband control signaling is transferred via a control channel routed through the UTRAN 3, the SGSN 5, the GGSN 6, the CSCF 7, the MGCF 9, and the PSTN/ISDN 10 as a control plane for the setup control signaling. During the initial setup of the multimedia call, a user plane connection or bearer is established between the IP terminal equipment 1 and the CS terminal equipment 11 via the UTRAN 3, the MGW 4, the SGSN 5, the GGSN 6 and the PSTN/ISDN 10, wherein the MGW 4 provides the adaptation or interworking function for adapting the PS connection of the UMTS network to the CS connection of the PSTN/ISDN 10.

The initial call control or call setup negotiation via the control channel or plane comprises a setup message in which the calling user proposes certain call characteristics. In an acknowledgement to the setup request, the called terminal accepts a "part" of the requested characteristics. This part is based on terminal characteristics of the called terminal, possibly also on some preset user preferences. Then, a second acknowledgement is transmitted as an answer message where the user preferences of the called terminal may be indicated as being accepted.

This negotiation principle is also used for negotiating the composition of a multimedia session, i.e. the media components required for the multimedia connection. To achieve this, a corresponding user capability information is set in a user capability information of an outband signaling message such as the setup message, so that the media components can be in negotiated via the outband control channel.

If the user capability information cannot be transported in the outband signaling, e.g. because the CS terminal equipment 11 does not support the new user capability information elements, a preferred multimedia session composition, i.e. the subscriber media profile 80 stored in the HSS 8, can be used in the negotiation towards the PS call party, i.e. the IP terminal equipment 1.

Figure 2:
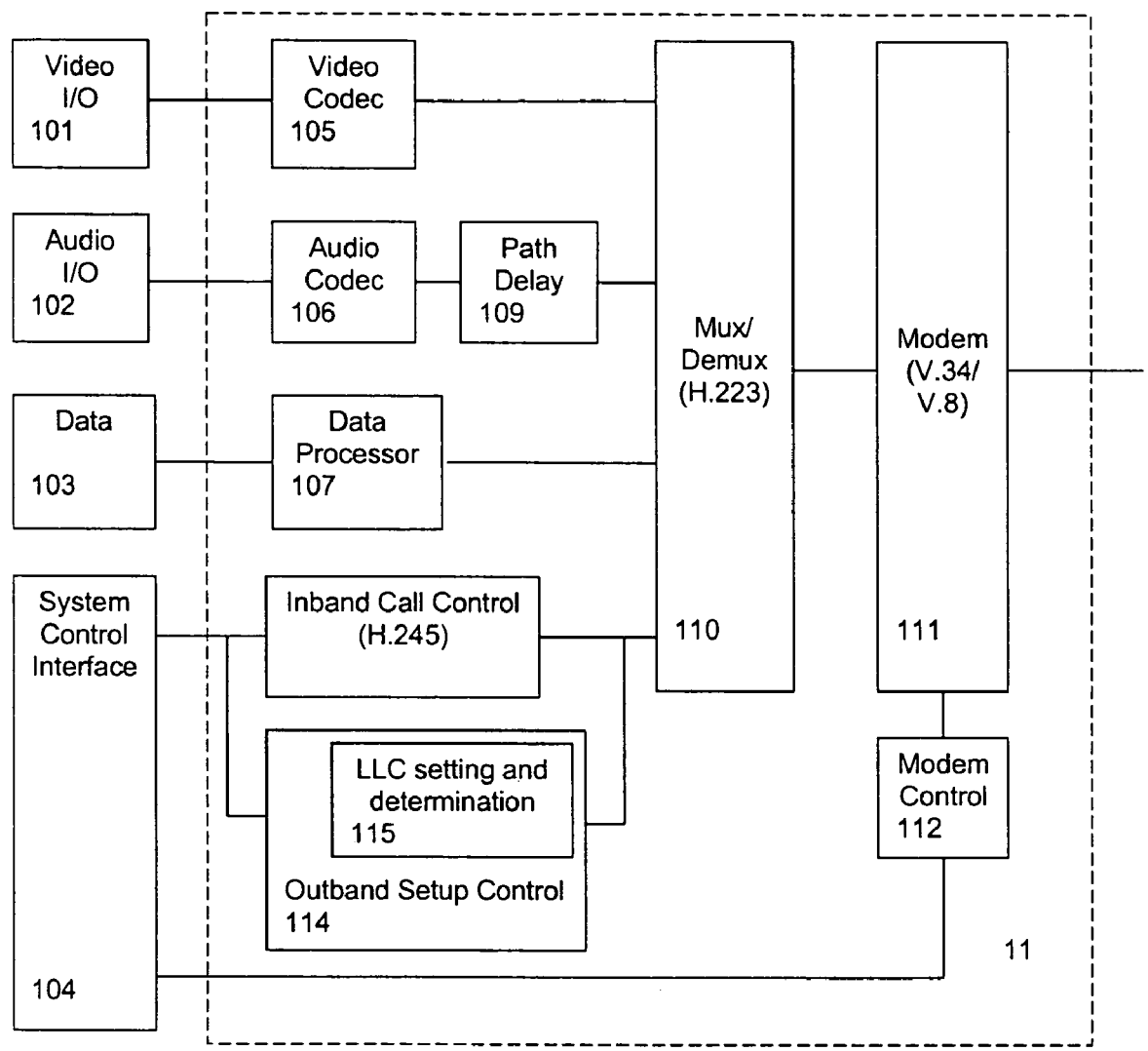
FIG. 2 shows a schematic block diagram of a CS multimedia terminal for PSTN according to the preferred embodiment of the present invention.

FIG. 2 shows a schematic block diagram of a CS terminal equipment 11 which is a H.324 terminal in the preferred embodiment. According to FIG. 2, a video input/output equipment 101, an audio input/output equipment 102, a data application equipment 103, and a system control interface 104 are connected to the CS terminal equipment 11. In particular, the video input/output equipment 101 may include cameras and monitors, their control and selection, video processing to improve compression or provide split-screen functions. The audio input/output equipment 102 may include a handset or other types of acoustic cabinets, microphones and loudspeakers, a telephone instrument or equivalent, attached audio devices providing voice activation sensing, multiple microphone mixers, acoustic echo cancellation and the like. The data application equipment 102 may comprise computers, non-standardized data application protocols, telematic visual aids such as electronic white boards and the like. The system control interface 104 provides control commands and indications between remote counter parts. Terminal-to-modem control conforms to the ITU-T recommendation V.25ter for terminals using external modems connected by a separate physical interface. Terminal-to-terminal control is performed according to the ITU-T recommendation H.245.

It is noted that in case of a H.324/I ISDN compliant terminal, the modem and modem control function is not provided.

Thus, the multimedia information streams supported in the CS terminal equipment 11 comprise video streams, audio streams, data streams and control streams. The video streams are continuous traffic carrying moving colour pictures. When used, the bit-rate available for the video streams may vary according to the needs of the audio and data channels. The audio streams are real-time, but may optionally be delayed in the receiver processing path to maintain synchronization with the video streams. In order to reduce the average bit-rate of the audio streams, voice activation may be provided. The data streams may represent still pictures, facsimile, documents, computer files, computer application data, undefined user data, and other data streams.

In the CS terminal equipment 11, a video codec 105 according to the ITU-T recommendations H.263 or H.261 is provided, which carries out redundancy reduction coding and decoding for the video streams received from the video input/output equipment 101. Furthermore, an audio codec 106 according to ITU-T recommendation G.723.1 is provided, which encodes an audio signal from a microphone of the audio input/output equipment 102 for transmission, and decodes an audio code received from the PSTN 10 the output to a speaker of the audio input/output equipment 102. An optional receive path delay circuit 109 may be provided for compensating a video delay, so as to maintain audio and video synchronization. An additional data processor 107 may be provided to support data applications such as electronic white boards, still image transfer, file exchange, database access, audiographics conferencing, remote device control, network protocols, and the like.

The system control interface 104 provides control signals or a modem control unit 112 which controls a modem 111 according to the ITU-T recommendation V.34 or V.8N.8bis. Furthermore, the system control interface 104 controls an inband call control function 113 and an outband setup control function 114. The inband call control function 113 may be arranged in accordance with ITU-T recommendation H.245 so as to provide the required capability exchange and channel signaling functions. Furthermore, the outband setup control function 114 may be arranged in accordance with ITU-T recommendation H.225 so as to provide the required outband setup control signaling. In the outband setup control function 114, an LLC setting and determination function 115 is provided for setting a user capability information e.g. to define supported media components of the CS terminal equipment 11. A multiplexer/demultiplexer 110 provides a multiplex protocol function according to the ITU-T recommendation H.223 so as to multiplex transmitted video, audio, data and control streams into a single bit stream, and to demultiplex a received bit stream into various multimedia streams according to the negotiated multimedia capability or media components. In addition, the multiplexer/demultiplexer 110 performs logical framing, sequence numbering, error detection, and error correction by means of retransmission, as appropriate to each media component.

A modem 111 converts the synchronous multiplexed bit stream into an analogue signal that can be transmitted over the PSTN 10 and converts the received analogue signal into a synchronous bit stream that is sent to the multiplexer/demultiplexer 110.

Due to the fact that user capability information is set by the LLC setting and determination function 115 in the LLC information element of a Q.931 setup message generated by outband setup control function 114, the handling of the media components is added to a protocol function. Thereby, negotiation of a multimedia session composition can be performed in the outband phase before entering the active phase of the call. In the setup of a H.324 call by the outband setup control function 114, the H.324 application is indicated in the BC (Bearer Capability) information element of the Q.931 setup message. This enables the called terminal to invoke its H.324 application to take care of the call in the active phase. By the additional user capability information defining reported media components, a refined H.324 information is provided in the setup message. To minimize the modifications of existing information elements, the Low Layer Compatibility (LLC) information element may be used to carry the user capability information or terminal characteristics and is passed transparently over the network between the calling and called terminals. The H.324 protocol is indicated in the LLC information element by specifying that user plane protocols (User Information Layer 1 Protocols (UIL1Ps)) are H.245 and H.223, i.e. the control and multiplexing protocols in H.324.

As an additional refined H.324 information, the user capability information may be added as a media description defining a set of supported media components (e.g. audio and video codecs and the like). In particular, new LLC elements may be added, each one specifying one media component i.e. one H.324-H.245 logical channel. The ISDN specification Q.931 used by the outband setup control function 114 allows for up to four LLC elements, while the GSM specification 24.008 currently allows for two LLC elements. Thus, new code points for the codecs of the media components (e.g. AMR (Advanced MultiRate) for audio and H.263 for video) can be added to UIL1P so as to refine the H.324 information. This setting is performed by the LLC setting and determination function 115.

As an alternative, code points for each possible combination of media components may be set in the LLC information element, e.g. AMR for audio and H.263 for video is specified by one code point. This relies on the fact that the majority of traffic is covered by a few combination cases.

As a further alternative, a new field can be added to the LLC information element, which defines a list of supported media components, e.g. a list of codecs. This constitutes the most flexible alternative, since the number of supported media types can be of any reasonable size. Due to the fact that the LLC information element is transparent to the core network, it will not affect implementation of core network elements such as the MGW 4, the SGSN 5, the GGSN 6, the CSCF 7 and others. Thus, the LLC information element will be supported wherever a corresponding supporting function is provided in a terminal equipment. A further alternative would be to use an existing GSM-UMTS adaptation mechanism for speech codecs, wherein the BC information element of the Q.931 message contains a list of speech codecs. Furthermore, a separate information element could be used for such a codec list.

In the event that a connection is to be established to a terminal equipment which does not support the outband user capability signaling function, the subscriber multimedia profile 80 stored in the HSS 8 can be used for setting the user capability information in the outband signaling message. As the subscriber multimedia profile 80 reflects the preference of the user, a suitable user interface can be determined. The retrieval of the subscriber multimedia profile 80 may be performed by the MGCF 9 based on a corresponding request issued by or via the CSCF 7 to the HSS 8. Then, the MGCF 9 provides a setting function for setting the user capability information in the corresponding outband signaling message according to the retrieved subscriber multimedia profile 80.

Figure 3:
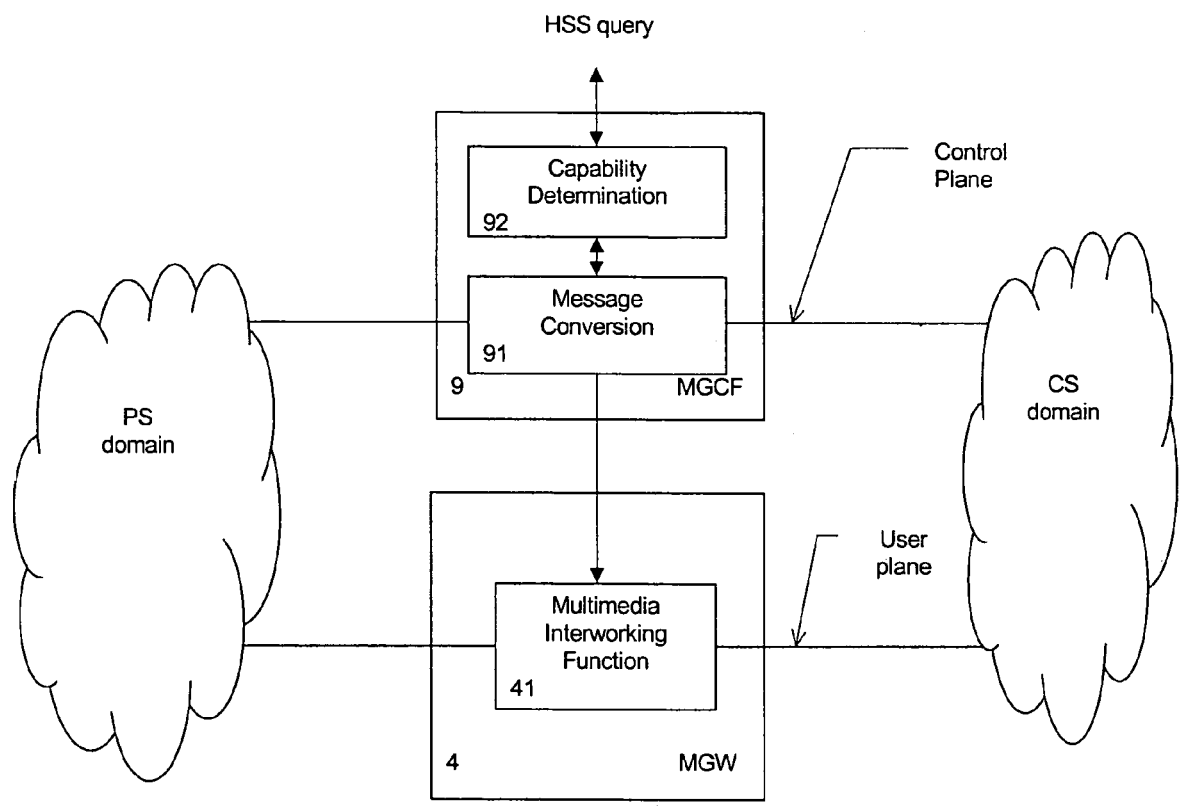
FIG. 3 shows a schematic block diagram of a multimedia gateway with a multimedia gateway control function according to the preferred embodiment of the present invention.

FIG. 3 shows a schematic block diagram comprising the MGCF 9 and the MGW 4. The MGCF 9 comprises a message conversion function 91 which is connected to the control channel or control plane used for the outband control signaling to the terminal equipments which are to be connected to each other. The message conversion function 91 is arranged to provide a conversion operation for converting the user capability information between the different signaling messages used in the PS domain and the CS domain. When the message conversion function 91 detects the absence of a user capability information, it supplies a corresponding information to a capability determination function 92 which is arranged to issue a media profile request as a HSS query towards the HSS 8 so as to obtain the subscriber multimedia profile 80 of the respective terminal equipment from which the signaling message has been received. The subscriber multimedia profile 80 is then supplied to the message conversion function 91 which generates a corresponding user capability information and sets the information element in the outband signaling message accordingly. The converted outband signaling message is then supplied to the active other domain. Based on the retrieved subscriber multimedia profile 80, a corresponding control information is supplied from the message conversion function 91 of the MGCF 9 to a multimedia interworking function 41 of the MGW 4, such that a corresponding interworking function can be established for the user plane connection or established bearer of the multimedia components.

To avoid a call offering of multimedia calls which a current terminal cannot support, the active subscriber multimedia profile 80 should not exceed the capabilities of the current terminal. To ensure this, the subscriber multimedia profile 80 needs to be updated at a sufficient frequency, e.g. each time the respective terminal is registered to the network. A typical case where the terminal capabilities are changed is given when a user changes the terminal to another one, i.e. in the case of a SIM roaming. Through the initiated registration procedure, the HSS 8 is updated every time the user moves the SIM (or SIM card) from one terminal to another with different capabilities. During the time, when the SIM is moved from one terminal to another, the subscriber is not available and it is thus impossible to negotiate a multimedia call with outdated or wrong capabilities. The update of the multimedia subscriber profile 80 may be performed as an integrated function of the registration procedure.

In the following, signaling scenarios are described with reference to FIGS. 4 and 5, wherein a connection is established between the IP terminal equipment 1 of the UMTS network and the CS terminal equipment 11 of the fixed network.

The IP terminal equipment 1 performs a setup signaling according to the Session Initiation Protocol (SIP) used for initiating calls in IP networks, such as the Internet. SIP can be used to establish multimedia sessions or calls such as Internet telephony, multimedia conferencing and distance learning. SIP supports user mobility, that is the ability of end users to make and receive calls and access subscribed telecommunication services from any location and the ability of the network to track the location of the user. The first step in the initiation of a call using SIP is to locate a SIP server for the callee. In the present case, the SIP server may be located at the MGCF 9. Once the SIP server has been found, the client can INVITE the callee to join a communication session by transmitting an INVITE message. A successful indication consists of an INVITE message followed an ACK message.

The INVITE message contains a session description that provides the call party with enough information to join the session. Furthermore, it contains such information as the media components and formats the caller is willing to receive along with where it wishes the callee to send any data. If the callee decides to accept the call, it responds with a session description of its own, listing the media components it is willing to receive. The session description is based on a Session Description Protocol (SDP) which indicates the media components, the transport protocol, the media format, and IP addresses and ports.

Figure 4:
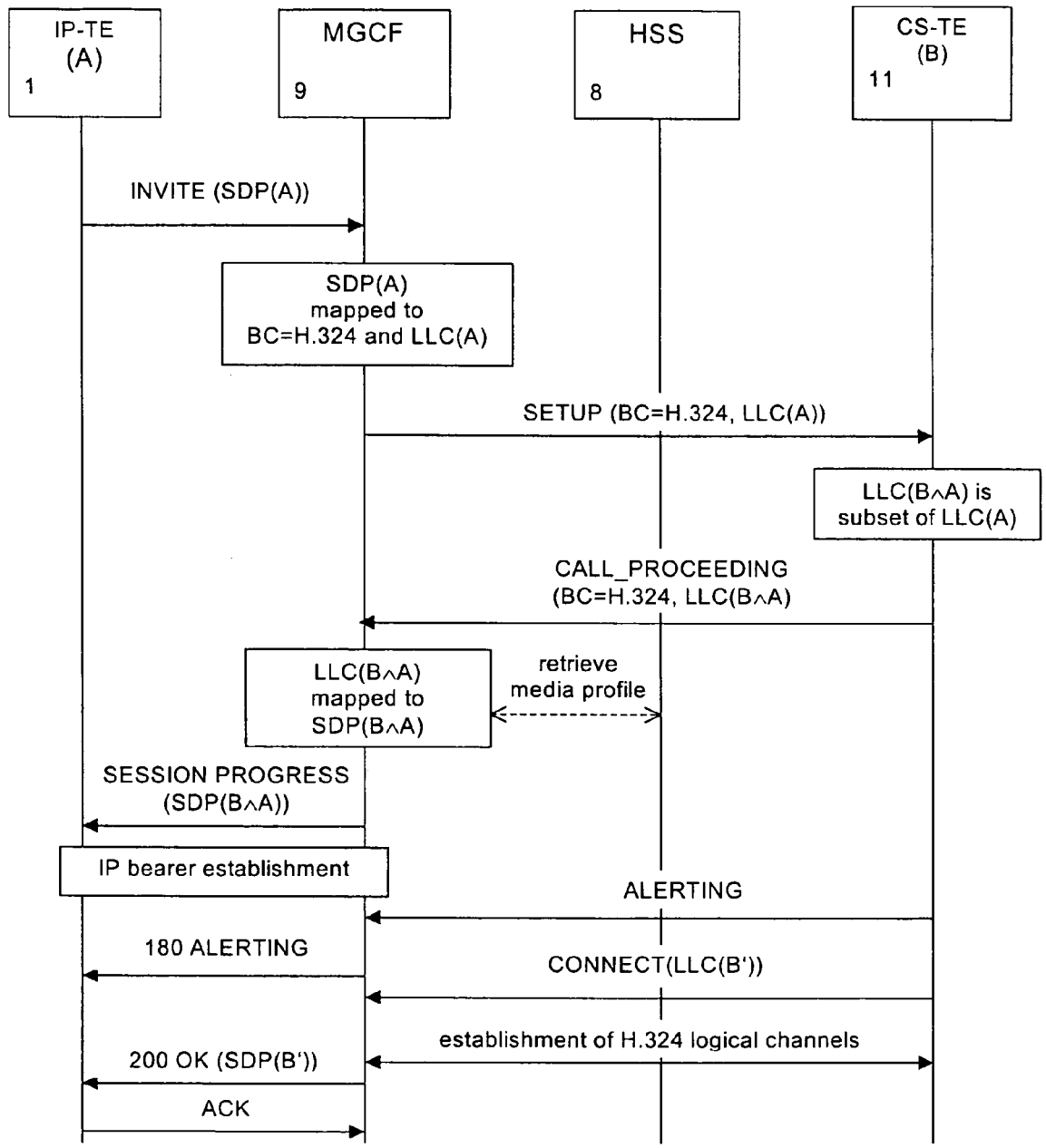
FIG. 4 shows a message signaling diagram for a PS-to-CS multimedia call.
Figure 5:
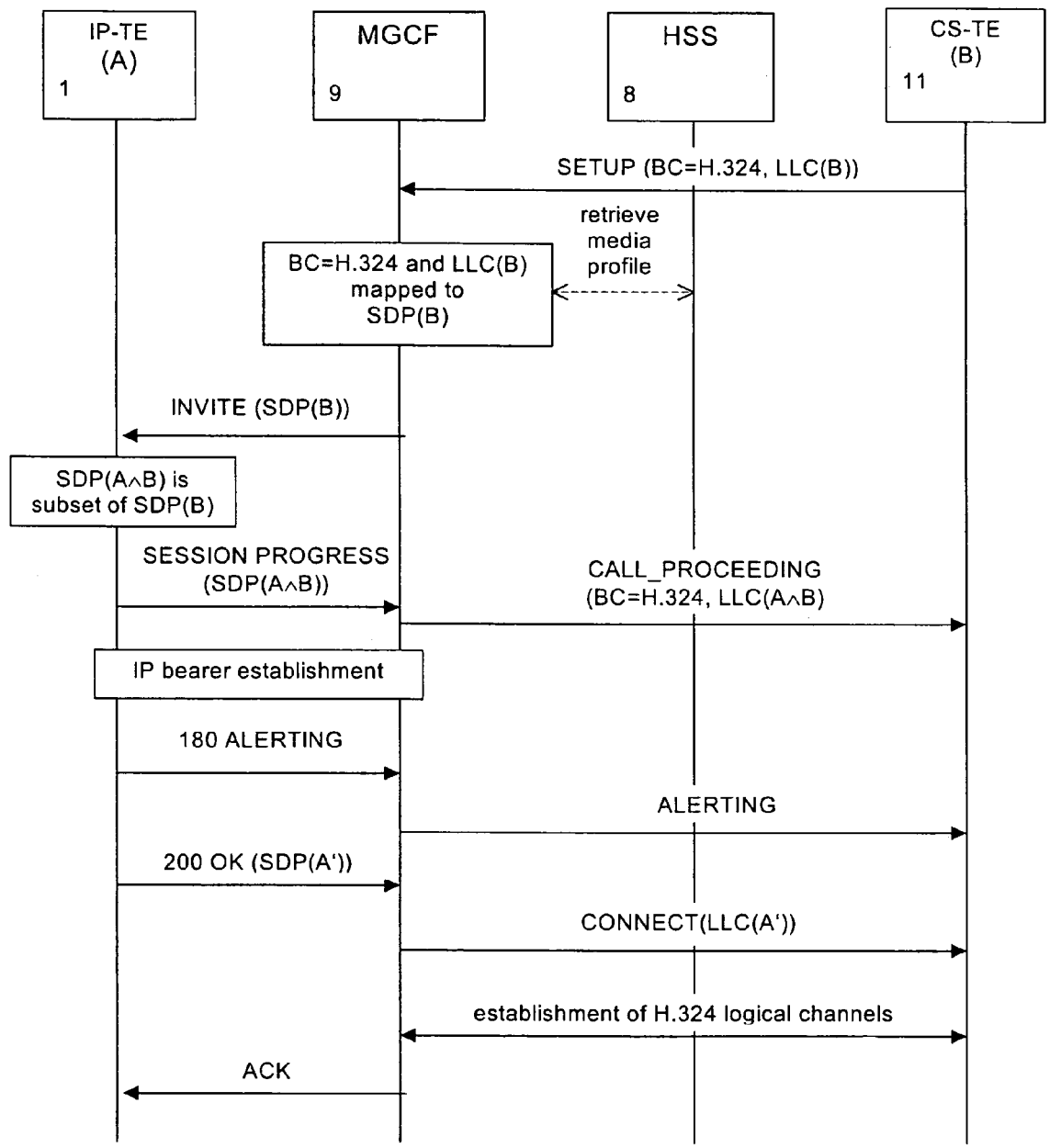
FIG. 5 shows a message signaling diagram for a CS-to-PS multimedia call.

FIG. 4 shows a message signaling diagram for a PS to CS call initiated by the IP terminal equipment 1 supporting media components A. The MGCF 9 receives a setup request (SIP Message INVITE) from the IP terminal equipment 1, which contains a session description of requested multimedia components SDP(A). Typically, the session may consist of a H.263 video component and an AMR audio component. Then, the message conversion function 91 of the MGCF 9 adds the requested multimedia components SDP(A) to the Q.931 information elements BC=H.324 (H.324/I) and LLC (A) and sends a Q.931 setup message containing the desired media components to the CS terminal equipment 11. At the LLC setting and determination function 115 of the CS terminal equipment 11, the received desired media components LLC(A) are compared to the supported media components B and a Q.931 CALL_PROCEEDING (or ISUP ADDRESS COMPLETE) message containing supported ones (LLC(B^A)) of the requested media components as a subset of the requested media components LLC(A). The message conversion function 91 of the MGCF 9 examines the CALL PROCEEDING or ADDRESS COMPLETE message with respect to the supported media types indicated in the message, and a SIP 183 SESSION PROGRESS message is issued to the IP terminal equipment 1 in the M domain. The LLC (B^A) information element is mapped to a corresponding session description SDP (B^A).

If the CALL PROCEEDING or ADDRESS COMPLETE message does not contain any indication of supported media components, the message conversion function 91 of the MGCF 9 controls the capability determination function 92 to retrieve the respective subscriber multimedia profile 80 from the HSS 8, which has been set during registration or through a user-initiated update procedure (the information may as well have been already retrieved earlier from the HSS 8). Accordingly, the outband media type negotiation based on the setup signaling has precedence over the HSS query.

Then, the message conversion function 91 of the MGCF 9 generates an intersection of offered and accepted media components and sends an acknowledgement to the IP terminal equipment 1 in the form of a SIP 183 SESSION PROGRESS message, in which the user capability information SDP(B^A) indicates the obtained intersection. Based on this media negotiation, an IP bearer is set up between the IP terminal equipment 1 and the MGW 4. Then, the CS terminal equipment 11 starts ringing and sends a Q.931 ALERTING or ISUP CALL PROGRESS message to the MGCF 9. The message conversion function 91 of the MGCF 9 translates this message into a corresponding SIP 180 ALERTING message which is transmitted to the IP terminal equipment 1. If the called user at the IP terminal equipment 1 wishes a different set of media components, he may send the new media components outband with a SIP CONNECT or ANSWER message as a preferred option. Alternatively, he may initiate an inband or in-call modification procedure to request the change.

The SIP connect message is converted by the message conversion function 91 of the MGCF 9 into a SIP 200 OK message and conveyed to the IP terminal equipment 1, while H.245 logical channels for the changed multimedia components LLC(B') are established by the multiplexer/demultiplexer 110. The calling user at the IP terminal equipment 1 acknowledges the answer by sending a SIP ACK message to the MGCF 9. Thus, the communication via the established connection can start, wherein the MGW 4 acts as an interworking function between the IP bearer and the H.245 logical channels.

In the following, a signaling relating to a CS to PS call is described with reference to FIG. 5.

Initially, the MGCF 9 receives a Q.931 SETUP message from the CS terminal equipment 11. If the setup message does not contain any indication of requested media components, coded into the LLC information element, the message conversion function 91 initiates a HSS query by the capability determination function 92 so as to obtain the subscriber multimedia profile 80 of the CS terminal equipment 11. Thus, again the media components indicated in the setup message have precedence over the possible HSS query.

The message conversion function 91 maps the media components obtained of the HSS query or the received LLC information element to a corresponding session description SDP(B) and generates an INVITE message which is transmitted via the CSCF 7 through the IP terminal equipment 1. The called party receives the INVITE message with the proposed set of media components SDP(B) and replies with a SIP 183 SESSION PROGRESS message containing supported media components SDP (A^B). When the MGCF 9 receives the SIP 183 SESSION PROGRESS message, the message conversion function 91 generates a Q.931 CALL PROCEEDING or ISUP ADDRESS COMPLETE message containing a corresponding LLC information element indicating the supported media components LLC(A^B). Then, a corresponding IP bearer is established between the IP terminal equipment 1 and the MGW 4. After the establishment of the IP bearer, the IP terminal equipment 1 starts ringing and sends a SIP 180 ALERTING message to the MGSF 9. The message conversion function 91 translates this message into the corresponding Q.931 ALERTING or ISUP CALL PROGRESS message.

At the moment the called party answers, the called IP terminal equipment 1 sends a SIP 200 OK message containing multimedia components SDP(A') desired by the called user. The message conversion function 91 translates the SIP 200 OK message into a Q.931 CONNECT message containing the desired multimedia components LLC(A'). Then, the logical channels for the desired media components are established by the multiplexer/demultiplexer 110 between the MGCF 9 and the CS terminal equipment 11 through an inband H.245 signaling controlled by the inband call control function 113.

It can also be conceived that, for instance, the opening of the logical channels has already been performed by the negotiation of the multimedia components using the outband negotiation in the call control protocol. Therefore, the terminals can start using the logical channels without a need for opening the logical channels using the H.245 inband signaling. Similarly, the H.245 master-slave determination procedures may be omitted.

The message conversion function 91 of the MGCF 9 sends a SIP ACK message containing the final agreed media components to the IP terminal equipment 1. Now, the communication may start over the established user plane connection.

In case of a connection establishment in a pure CS environment, the message conversion function 91 of the MGCF 9 is not required. A Q.931 SETUP message is transmitted via corresponding switching elements, such as a Mobile Switching Center (MSC) in a wireless communication network, to the called terminal equipment. There, a comparison between the desired media components LLC(A) contained in the SETUP message and the own supported media components is performed and a supported subset LLC(B^A) is transmitted back in a Q.931 CALL PROCEEDING message to the calling terminal. Then, a Q.931 ALERTING message is transmitted from the called terminal to the calling terminal, followed by a Q.931 CONNECT message which may contain desired (other) media components LLC(B'). When the CONNECT message has been received, corresponding H.245 logical channels for the desired multimedia components are established. Thus, an outband negotiation scheme for media components is provided where the calling party proposes a set of user capabilities such as possible encodings. The set of user characteristics or capabilities is reduced to the user capabilities supported by the called party. The final capability is chosen at answer. If no user capability is indicated, or no common capability is provided, a corresponding information may be obtained from a multimedia profile database at the HSS 8 or any corresponding subscriber database such as a Home Location Register (HLR). Thereby, corresponding user capabilities or media components can be negotiated in the initial outband signaling via the outband control channel to simplify the establishment of the connection and to reduce the setup time.

It is noted that the present invention is not restricted to the preferred embodiment described above, but can be implemented in any fixed or wireless network environment, where an initial outband signaling is provided for setting up a connection. Any suitable information element of an outband signaling message may be used for conveying the user capability information through the outband control channel. The preferred embodiment may thus vary within the scope of the attached claims.

The invention claimed is:

1. A method:
   indicating in at least one capability information element within an outband signaling message the supported at least one type of information stream;
   adapting message flows of packet switched network signalling elements and circuit switched network signalling elements to enable an end-to-end multimedia capability negotiation;
   adapting the capability information between said packet switched network signalling elements and said circuit switched network signalling elements to enable an end-to-end multimedia capability negotiation;
   performing a capability negotiation by transmitting said capability information between a packet switched terminal and a circuit switched terminal or between said packet switched terminal and a multimedia control function, said circuit switched terminal device comprising at least one information processor, each information processor supporting at least one type of information stream;
   selecting at least one of said information processors based on the result of said capability negotiation; and
   establishing a multimedia connection using said selected at least one information processor between said packet switched terminal and said circuit switched terminal based on said selected type of information stream.

2. The method of claim 1, further comprising:
   setting at least one code in said at least one capability information element;
   determining said supported at least one type of information stream; and
   mapping said supported at least one type of information stream into said at least one code.

3. The method of claim 2, wherein said mapping is performed in a gateway configured to adapt between circuit switched and packet switched connections.

4. The method of claim 2, wherein said mapping is performed by analyzing at least one information stream description and determining a code identifying said at least one information stream description.

5. The method of claim 4, wherein said information stream description is a session description protocol description.

6. The method of claim 4, wherein said information stream description is a H.323 logical channel description.

7. The method of claim 1, wherein said at least one type of information stream comprises different media components.

8. The method of claim 1, wherein said outband signaling message is a call setup message.

9. The method of claim 1, further comprising:
   performing said setting of said code in said circuit switched terminal device.

10. The method of claim 1, wherein said multimedia connection is a H.324 connection.

11. The method of claim 10, wherein said capability information element is a low layer compatibility information element of a Q.931 setup message.

12. The method of claim 11, wherein media components required for said at least one information processor are set by using a corresponding predetermined coding of said low layer compatibility information element.

13. The method of claim 11, wherein a combination of media components required for said at least one information processor is set by using a corresponding predetermined coding of said low layer compatibility information element.

14. The method of claim 11, wherein a predetermined field is provided in said low layer compatibility information element, said field defining a list of media components supported by said at least one information processor.

15. The method of claim 12, wherein said media components are codec types supported by said at least one information processor.

16. The method of claim 15, wherein said at least one information processor comprises a video codec, an audio codec, and a data processor for a data application.

17. The method of claim 10, wherein a code is set in a codec list of a bearer capability information element or another predetermined information element of a Q.931 setup message, in accordance with said capability information element.

18. The method of claim 1, wherein said capability negotiation is performed by a mapping operation between said code of said outband signaling message and a corresponding user capability information of said packet switched terminal.

19. The method of claim 18, wherein said mapping operation is performed at a network element.

20. The method of claim 1, further comprising:
   storing a user profile indicating said supported types of information streams in a subscriber database; and
   performing said setting of said code in a network element when said code has not yet been set in said outband signaling message or when said result of negotiation does not indicate any supported types of information streams.

21. The method of claim 19, wherein said network element comprises a media gateway control function.

22. The method of claim 20, wherein said subscriber database is a home location register or a home subscriber server.

23. The method of claim 20, wherein said user profile is a user multimedia profile.

24. The method of claim 20, further comprising:
   updating said subscriber database when said circuit switched terminal device is registered to the network of said network element.

25. The method of claim 18, wherein said corresponding user capability information is provided in a session description protocol information of a session initiation protocol Invite message.

26. The method of claim 18, further comprising:
   indicating said result of negotiation to said circuit switched terminal device in a Q.931 call proceeding or address complete message and to said packet switched terminal device in a session initiation protocol session progress message.

27. A method comprising:
   storing user profiles indicating supported types of information streams in a subscriber database;
   reading a user profile of a circuit switched terminal device from said subscriber database;
   setting a user capability information in an outband signaling message based on said read user profile of said circuit switched terminal device; and
   performing a capability negotiation by transmitting said outband signaling message via an outband control channel to a packet switched terminal device at another end of a connection established to said circuit switched terminal device.

28. The method of claim 27, wherein said user profile indicates media components supported by said circuit-switched terminal device.

29. The method of claim 27, wherein said user capability information is set at a network element through which said outband control channel is routed.

30. The method of claim 29, wherein said network element comprises a media gateway control function.

31. A terminal device, comprising:
at least one information processor configured to process at least one type of information stream;
a setting unit configured to indicate in at least one capability information element within an outband signaling message the supported at least one type of information stream;
an outband signaling control unit configured to perform a capability negotiation by transmitting said outband signaling message via an outband control channel; and
a selecting unit configured to select at least one of said information processors based on the result of said capability negotiation.

32. The terminal device of claim 31, wherein said at least one information processor comprises a video codec, an audio codec, and a data processor for a data application.

33. The terminal device of claim 31, wherein said selecting unit comprises a H.223 multiplexer.

34. The terminal device of claim 31, wherein said outband signaling control unit comprises an H.225 setup control unit configured to perform outband setup control based on Q.931 messages.

35. The terminal device of claim 31, wherein said terminal divice is a H.324 terminal.

36. The terminal device of claim 31, wherein said terminal device comprises a pre-selection function configured to enable a user to preset a preferred composition of the at least one information processor.

37. A network element, comprising:
a determination unit configured to obtain a user profile of a terminal device based on an interrogation of a subscriber database; and
a conversion unit configured to convert a received signaling message into an outband signaling message supported by said terminal device, configured to set a user capability information in said outband signaling message based on said obtained user profile, and configured to transmit said outband signaling message via an outband control channel to said terminal device to establish a connection to said terminal device.

38. The network element of claim 37, wherein said user capability information defines media components supported by said terminal device.

39. The network element of claim 37, wherein said received signaling message is a session initiation protocol signaling message and said outband signaling message is a Q.931 or integrated service digital network user part signaling message.

40. The network element of claim 39, wherein said user capability information is a low layer compatibility information element of said Q.931 signaling message.

41. The network element of claim 37, wherein said network element comprises a media gateway control function.

42. A terminal device, comprising:
at least one information processing means for processing at least one type of information stream;
setting means for indicating in at least one capability information element within an outband signaling message the supported at least one type of information stream;
outband signaling control means for performing a capability negotiation by transmitting said outband signaling message via an outband control channel; and
selecting means for selecting at least one of said information processing means based on the result of said capability negotiation.

43. A network element, comprising:
determination means for obtaining a user profile of a terminal device based on an interrogation of a subscriber database; and
conversion means for converting a received signaling message into an outband signaling message supported by said terminal device, for setting a user capability information in said outband signaling message based on said obtained user profile, and for transmitting said outband signaling message via an outband control channel to said terminal device to establish a connection to said terminal device.

* * * * *